US006540074B1

(12) United States Patent
Sankey et al.

(10) Patent No.: US 6,540,074 B1
(45) Date of Patent: *Apr. 1, 2003

(54) VIDEO CASSETTE CONTAINER

(75) Inventors: James K. Sankey, Hudson, OH (US); Ronald M. Marsilio, Mogadore, OH (US); James T. Weisburn, Massillon, OH (US); Ronald K. Burdett, Strasburg, OH (US); Christopher G. Gallagher, Akron, OH (US)

(73) Assignee: Nexpak Corporation, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/695,106

(22) Filed: Oct. 24, 2000

Related U.S. Application Data

(63) Continuation of application No. 09/350,551, filed on Jul. 9, 1999, now Pat. No. 6,170,660, which is a continuation of application No. 08/778,168, filed on Jan. 2, 1997, now Pat. No. 5,975,298.

(51) Int. Cl.[7] .............................................. B65D 85/67
(52) U.S. Cl. .................................. 206/387.13; 206/472
(58) Field of Search ............................ 206/387.1, 472, 206/474, 387.13, 815; 220/4.22, 4.23, 836, 837; D9/420, 423, 424, 426, 430; D6/407, 626–635, 432

(56) References Cited

U.S. PATENT DOCUMENTS

| D180,747 S | 8/1957 | Parcher |
|---|---|---|
| 3,415,407 A | 12/1968 | Alden et al. |
| 3,494,458 A | 2/1970 | Meierhoefer |
| D218,581 S | 9/1970 | Strom |
| 3,635,331 A | 1/1972 | Zucker |
| 3,896,929 A | 7/1975 | Mills |
| D259,596 S | 6/1981 | Gray |
| 4,293,266 A | 10/1981 | St. Lawrence et al. |
| 4,341,307 A | 7/1982 | Shyers |
| D268,380 S | 3/1983 | Thiele |
| 4,381,836 A | 5/1983 | Rivkin et al. |
| 4,452,373 A | 6/1984 | Pearce et al. |
| 4,489,832 A | 12/1984 | Helms |
| 4,496,048 A | 1/1985 | Sykes |
| 4,518,275 A | 5/1985 | Rauch, III et al. |

(List continued on next page.)

FOREIGN PATENT DOCUMENTS

| DE | 3425579 A1 | 1/1986 |
|---|---|---|
| JP | 2-141389 | 11/1990 |
| JP | 4-97088 | 8/1992 |
| JP | 05085585 A | 4/1993 |
| JP | 05178389 A | 7/1993 |
| JP | 5-221479 | 8/1993 |
| JP | 05246479 A | 9/1993 |
| JP | 06064681 A | 3/1994 |
| JP | 7-2292 | 1/1995 |
| WO | WO 90/15001 | 12/1990 |
| WO | WO 96/25966 | 8/1996 |

*Primary Examiner*—Shian Luong
(74) *Attorney, Agent, or Firm*—Sand & Sebolt

(57) ABSTRACT

A video cassette storage container formed as a one-piece member of polypropylene where the container has a smooth outer contour and configured sidewalls and hinge area to provide an extremely aesthetically pleasing and efficient storage container. The container further has square feet on one end thererof for endwise standing of the video storage container. The container also has a recessed front for easy opening where the recessed front is also arcuate or scalloped so as to extend inward into the container to assist in holding and centering video cassette tape. The container also has ribs on the inner surface thereof which automatically centers the video cassette and its associated literature into the storage container during manual insertion of a cassette therein.

7 Claims, 9 Drawing Sheets

U.S. PATENT DOCUMENTS

| | | |
|---|---|---|
| 4,593,814 A | 6/1986 | Hagiwara et al. |
| 4,634,004 A | 1/1987 | Mortensen |
| 4,703,853 A | 11/1987 | Byrns |
| 4,724,957 A | 2/1988 | Burgschweiger |
| 4,753,347 A | 6/1988 | Bellante et al. |
| 4,793,479 A | 12/1988 | Otsuka et al. |
| 4,805,769 A | 2/1989 | Soltis et al. |
| 4,838,420 A | 6/1989 | Collett et al. |
| 4,874,085 A | 10/1989 | Grobecker et al. |
| D305,580 S | 1/1990 | Nozaki |
| 4,913,287 A | 4/1990 | Kagano |
| 4,962,854 A | 10/1990 | Ricci |
| 4,974,740 A | 12/1990 | Niles et al. |
| 5,016,752 A | 5/1991 | Haugen, Jr. |
| D324,337 S | 3/1992 | Brady |
| D324,950 S | 3/1992 | Ozeki |
| 5,145,068 A | 9/1992 | Schmitz et al. |
| 5,161,907 A | 11/1992 | Byrne |
| D335,575 S | 5/1993 | Suwa |
| 5,209,593 A | 5/1993 | Ros |
| 5,251,750 A | 10/1993 | Gelardi et al. |
| 5,285,918 A | 2/1994 | Weisburn et al. |
| D350,044 S | 8/1994 | Long et al. |
| 5,344,039 A | 9/1994 | Taniyama |
| D351,082 S | 10/1994 | Long et al. |
| 5,377,825 A | 1/1995 | Sykes et al. |
| 5,443,159 A | 8/1995 | Cheng |
| 5,494,159 A | 2/1996 | Schoettle |
| 5,499,714 A | 3/1996 | Konno |
| 5,526,926 A | 6/1996 | Deja |
| 5,544,748 A | 8/1996 | Kollinek |
| 5,549,203 A | 8/1996 | Weisburn et al. |
| 5,566,828 A | 10/1996 | Claes et al. |
| 5,605,227 A | 2/1997 | Morita |
| 5,609,250 A | 3/1997 | Moser |
| 5,636,737 A | 6/1997 | Marsilio |
| D385,454 S | 10/1997 | Marsilio et al. |
| 5,690,224 A | 11/1997 | Koizumi |
| 5,772,028 A | 6/1998 | Marsilio et al. |
| 5,775,500 A | 7/1998 | Williams |
| 5,788,068 A | 8/1998 | Fraser et al. |
| 5,975,298 A | 11/1999 | Sankey et al. |
| D422,428 S | 4/2000 | Pijanowski et al. |

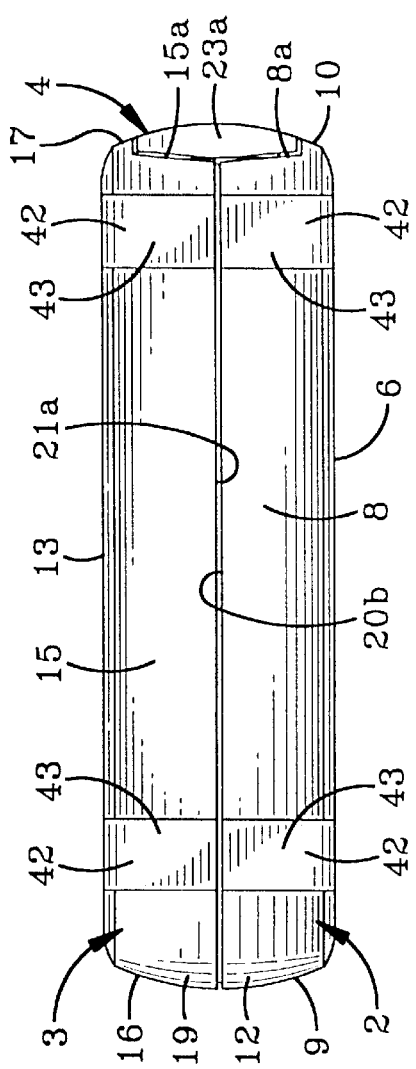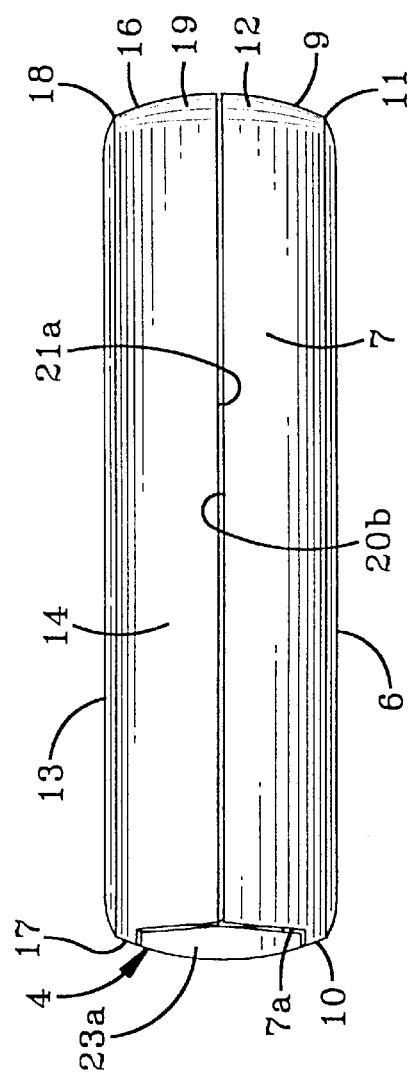

| FIG-9A | FIG-9B |

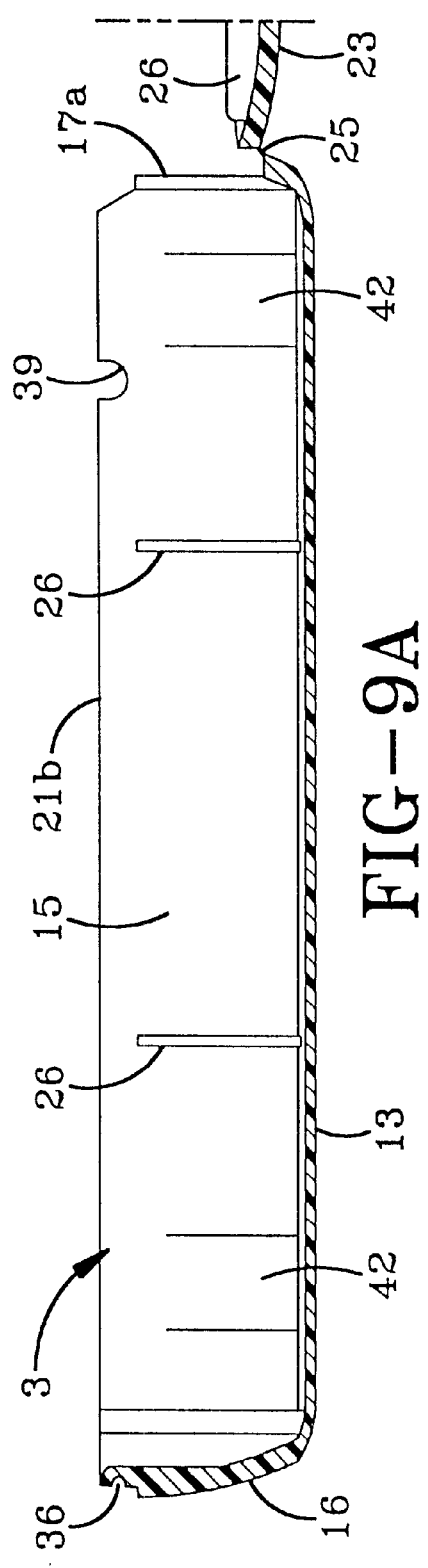
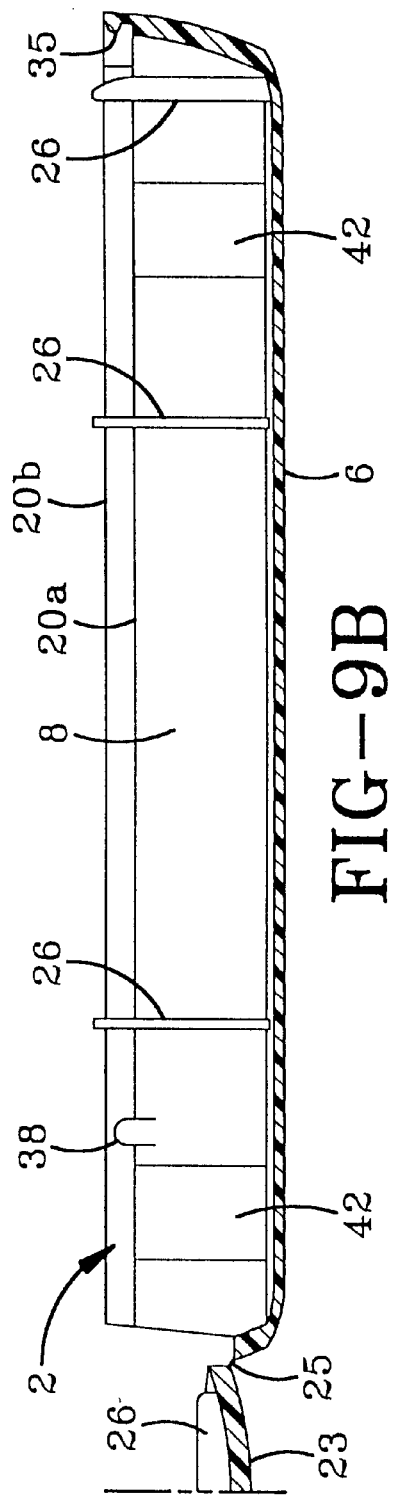
FIG-9A
FIG-9B

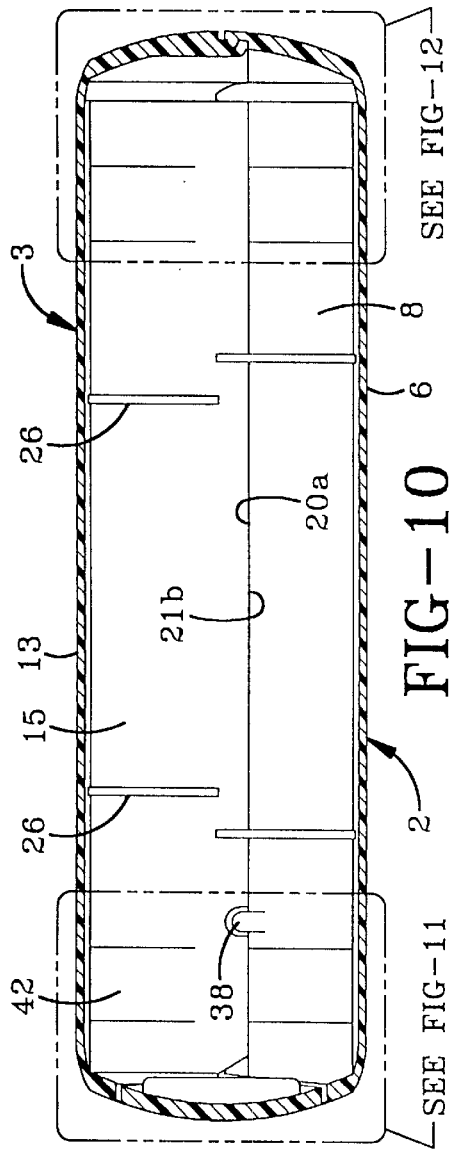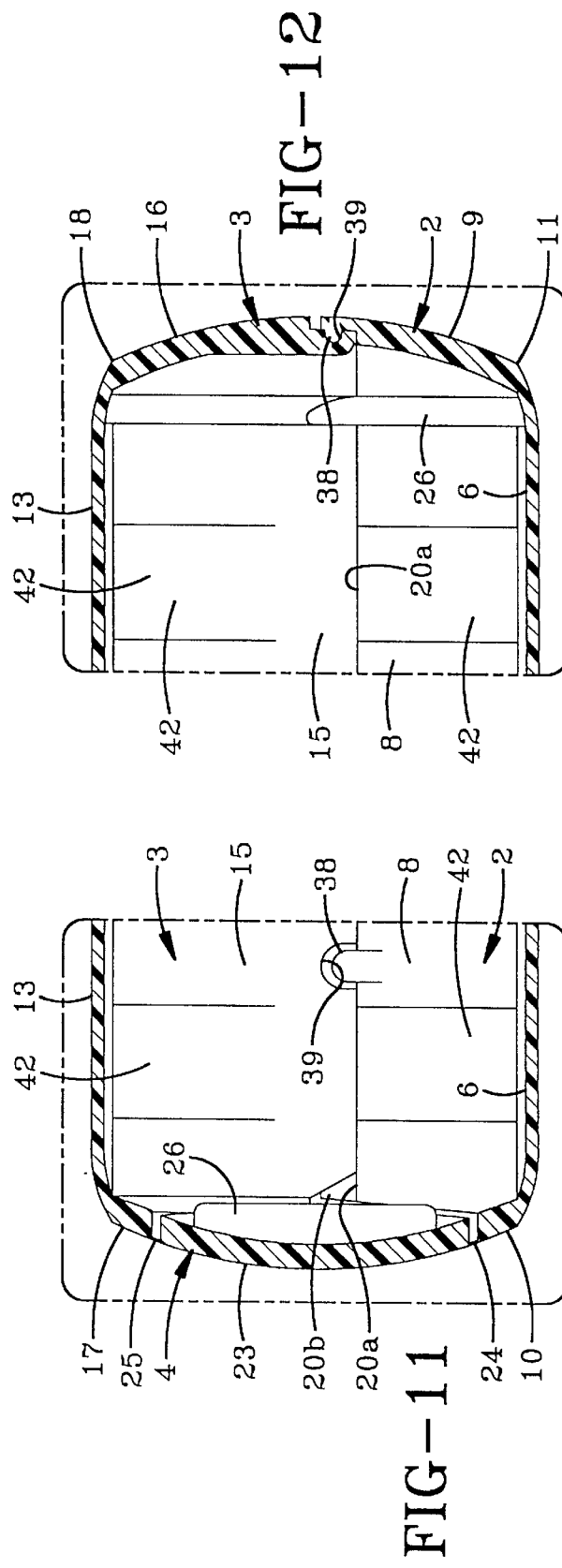

VIDEO CASSETTE CONTAINER

CROSS REFERENCE TO RELATED APPLICATIONS

This application is a continuation of application Ser. No. 09/350,551 filed Jul. 9, 1999 now U.S. Pat. No. 6,170,660, which was a continuation application of Ser. No. 08/778,168 filed Jan. 2, 1997, based on U.S. Pat. No. 5,975,298; the disclosures of which are incorporated herein by reference.

BACKGROUND OF THE INVENTION

1. Technical Field

The invention relates to a storage container and, in particular, to a storage container for a video cassette. Even more particularly, the invention relates to a video cassette storage container formed as a one-piece member of polypropylene, having a smooth outer contour and configured sidewalls and hinge area to provide an extremely aesthetically pleasing and efficient storage container, having square feet on one end thereof for endwise standing of the video storage container, having a recessed front for easy opening which is also scalloped inward to hold tapes, and having guide rails on an inner surface thereof in addition to the scallops which together automatically centers the video cassette and its associated literature into the storage container during manual insertion of a cassette therein.

2. Background Information

Numerous containers for various articles, including video cassette tapes, have been developed, usually of plastic materials, such as shown in U.S. Pat. Nos. 4,291,801, 4,363,403, 4,365,711, 4,407,410, 4,635,797, and 4,784,264. Although these prior art storage containers are satisfactory for their intended purposes, many are made of various types of plastics, such as crystal polystyrene, which is brttle and subject to breakage, and when molded will have a square appearance with straight edges terminating in sharp corners and edges. It has been found that these straight edges terminating in sharp corners and edges promote breakage of the storage containers when dropped.

Many of the prior art storage containers also include a closure mechanism that occupies space within the storage compartment thereby increasing the overall size of the container. In many of today's entertainment centers and other video storage areas, space is an important constraint, particularly based upon the large video libraries many homes have today. Therefore, many of these containers needlessly occupy more space than necessary.

Likewise, the hinge assembly of many prior art containers requires that the containers be closed in a single fashion often requiring precise and meticulous alignment of the video cassette within the video storage container. Often this single fashion closing is not readily accomplished by small children who increasingly use these storage containers for storing family entertainment video cassettes. Further, the video cassettes and associated literature must be accurately and carefully centered in these prior art storage containers or else it is often difficult if not impossible to close the container.

Likewise, many of the prior art storage containers are difficult to open by children, since their small hands are unable to grip the entire outer cover and base for pulling the container apart in order to gain access to the video cassette stored therein.

In addition, some of the video storage containers do not include at least one square surface for standing of the videos as is often desirable during storage. Alternatively, some of the containers that do contain an edge sufficient for standing the video storage container are often very sharp edges or corners which as indicated above are undesirable. Furthermore, these edges that are sufficient for standing often increase substantially the overall size of the container.

Thus, the need exists for an improved video cassette storage container which can be formed as a one-piece member of a light weight, break-resistant plastic such as polypropylene, which provides an attractive appearance and is easily used by small children for storing video cassettes, which has rounded sides with radiused edges, and a rounded spine formed by the hinge assembly to provide an attractive appearance and which includes a square base for endwise standing where the square base has radiused edges, and which includes a recessed front which provides easy opening even for small children and which includes a scalloped or otherwise arcuate interior to help hold the tape within the video storage container, and which provides ribs on the hinge panel for automatic centering of the tape during closure where the ribs act in unison with the scallop to function as guides to center the video cassette and associated literature in the storage container.

SUMMARY OF THE INVENTION

Objectives of the invention include providing an improved video cassette storage container formed as a one-piece member of plastic with the sides thereof having radiused rounded edges, and a rounded spine formed by a double living hinge panel assembly to provide an attractive and compact storage container.

A further objective of the invention is to provide such a storage container in which the latch mechanism that maintains the storage container in a closed position is achieved by a small pair of nubs formed on one of the half-wall members which seat into a complementary-shaped pair of recesses formed in an opposite half-wall member of the container.

A still further objective of the invention is to provide such a storage container in which central portions of the front wall of the base and lid are slightly recessed to provide larger overhang areas on the base and lid which can be easily grasped by a child to open the storage container without affecting the size of the container and its attractive appearance.

A still even further objective of the invention is to provide a recessed front in which central portions of the front wall of the base and lid are recessed so as to extend within the interior of the video cassette storage container in a scalloped fashion thereby providing a surface that helps to align the video cassette when inserted within the storage container.

Another objective of the invention is to provide such a storage container having a unique end wall configuration at the ends of a concavely curved hinge panel which enables the base and lid to be moved into a closed position irrespective of the manner of movement of the base, lid or hinge assembly.

Another objective of the invention is to provide such a storage container in which a plurality of positioning ribs and guide members are formed integrally on the inside surfaces of either the base or lid walls and main panel thereof to define an area for receiving the video cassette, irrespective of its manner of placement between the positioning ribs, and which will prevent the cassette from moving or rattling within the storage compartment formed by the container when in its closed position.

A still further objective of the invention is to provide such a storage container in which the front and end walls of the base and lid are equal in height, with one of the closure members having a stepped shoulder and an extending recessed wall portion for aligning with the edges of the end and front walls of the corresponding container member when in the closed position.

A further objective of the invention is to provide such a storage container in which the front corners of the base and lid are rounded and align with each other when in the closed position to provide an attractive streamlined appearance, individually and in combination with the rounded spine provided by the double hinge panel assembly.

Another objective of the invention is to provide such a storage container which automatically guides and centers the video cassette and literature in the storage container when the video cassette and literature are loaded therein.

A still further objective of the invention is to provide such a storage container in which a plurality of ribs and guides are formed on the inner surface of one of the base or lid to facilitate the automatic guiding and centering of the video cassette and literature in the storage container.

These objectives and advantages are obtained by the improved video cassette storage container of the present invention, the general nature of which may be stated as including a base and a lid each having a bottom wall, a pair of spaced end walls and a front wall, a lid hingedly mounted on the base and movable between open and closed positions on the base, the base and lid forming a storage chamber therebetween when in the closed position, and guide means formed on certain of the walls of the lid and extending into the storage chamber for guiding the article into the storage chamber.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

FIG. 5 is a right end view of the video cassette container of FIG. 1;

FIG. 6 is a left end view of the video cassette container of FIG. 1;

FIG. 9A is an end cross-sectional view as taken along line 9—9 in FIG. 8 of one half of the video cassette container of FIG. 1;

FIG. 9B is an end cross-sectional view as taken along line 9—9 of FIG. 8 of the other half of the video cassette container of FIG. 1;

FIG. 10 is the same end cross-sectional view as in FIGS. 9A and 9B except the video cassette container is in a closed rather than an open position;

FIG. 11 is an enlarged view of the hinged end of the video cassette container as shown in FIG. 10;

FIG. 12 is an enlarged view of the locking end of the video cassette container as shown in FIG. 10;

DETAILED DESCRIPTION OF THE DRAWINGS

Figure 1:
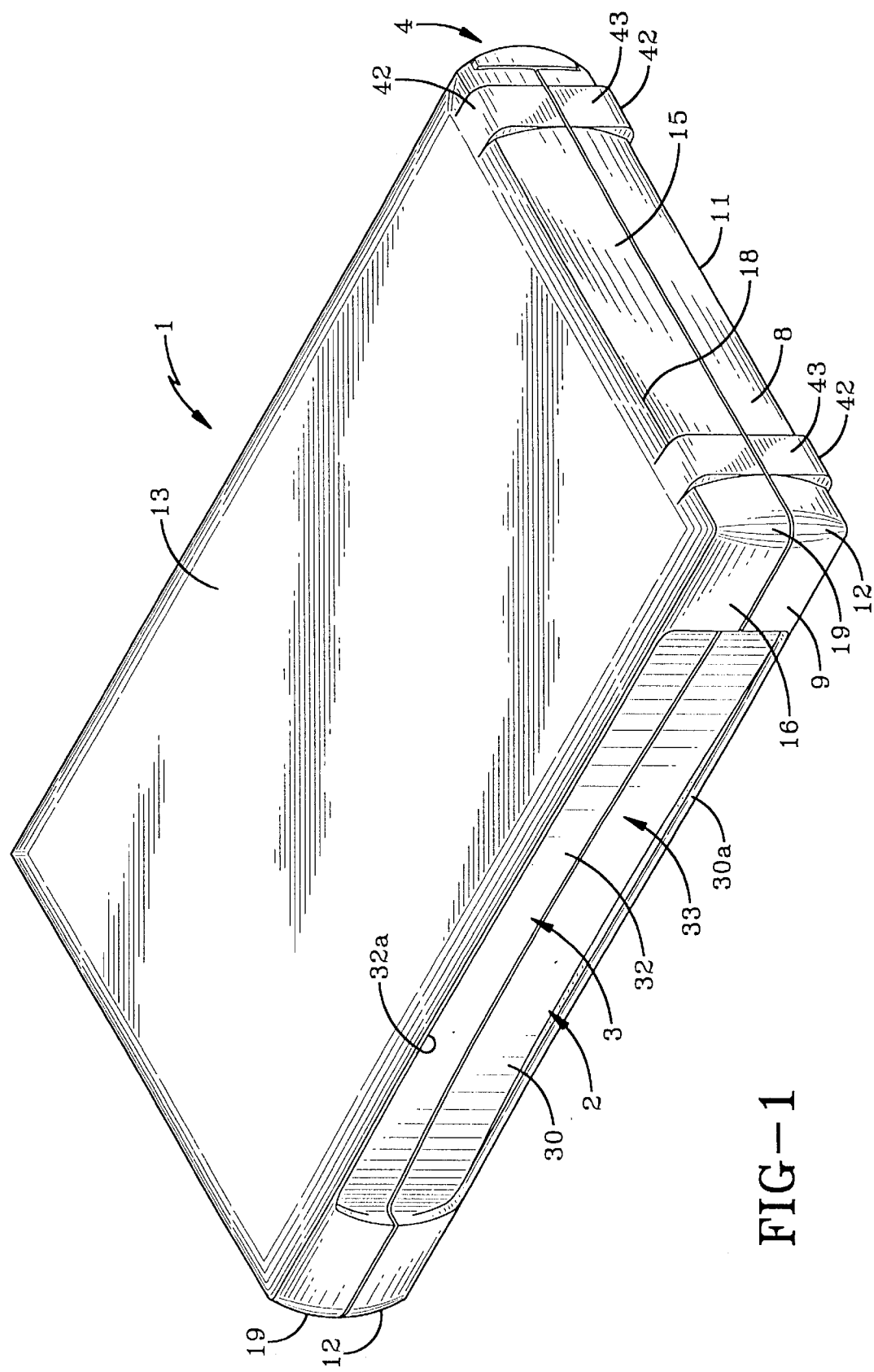
FIG. 1 is a perspective view of the video cassette container of the present invention in closed position.
Figure 2:
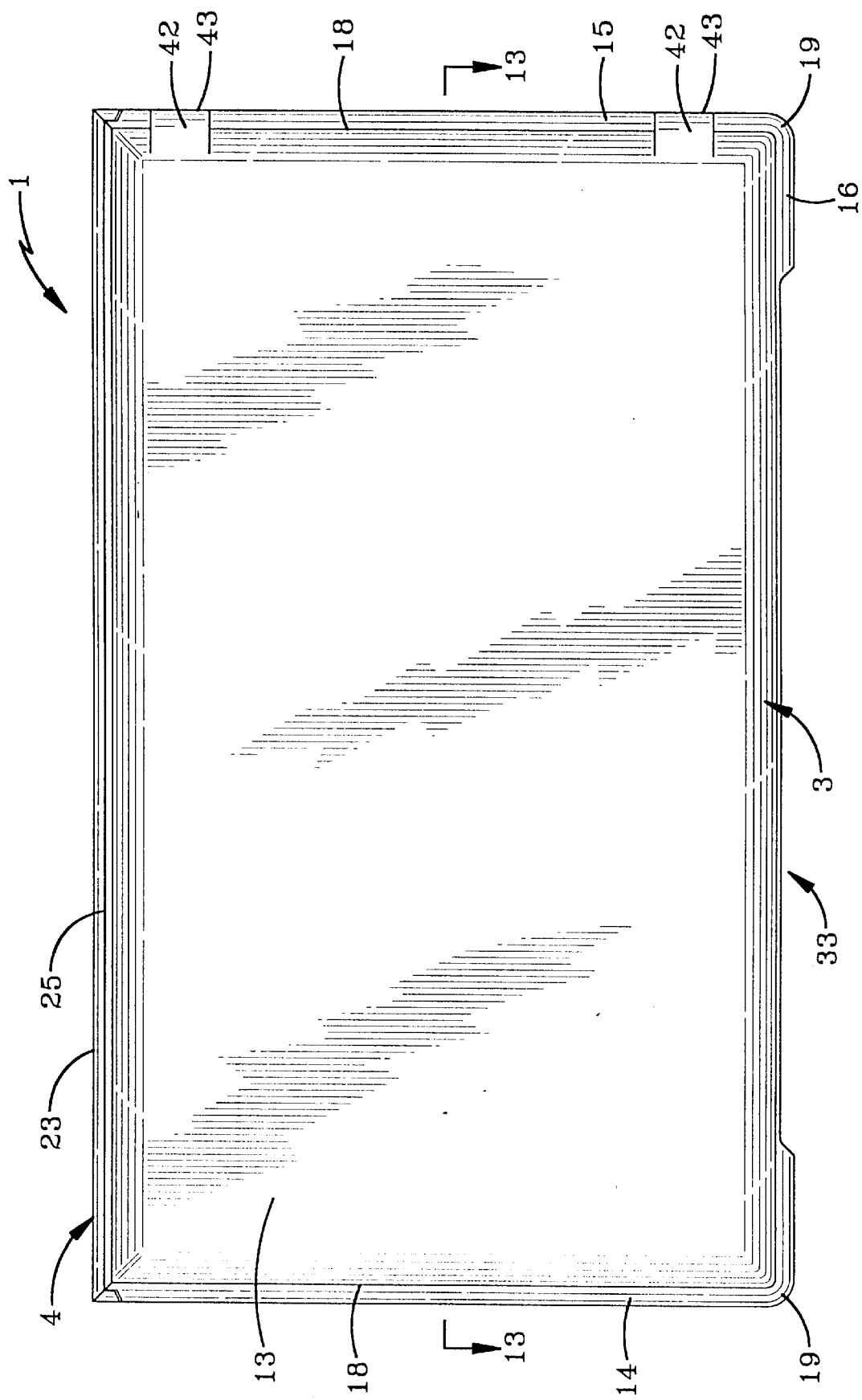
FIG. 2 is a top plane view of the video cassette container of FIG. 1.
Figure 3:
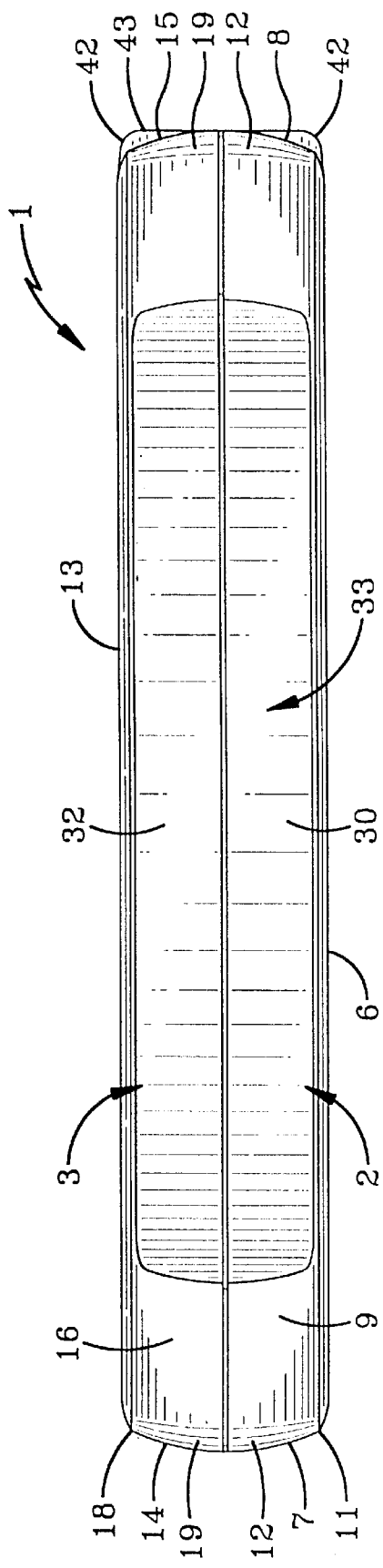
FIG. 3 is a front elevational view of the video cassette container of FIG. 1.
Figure 4:
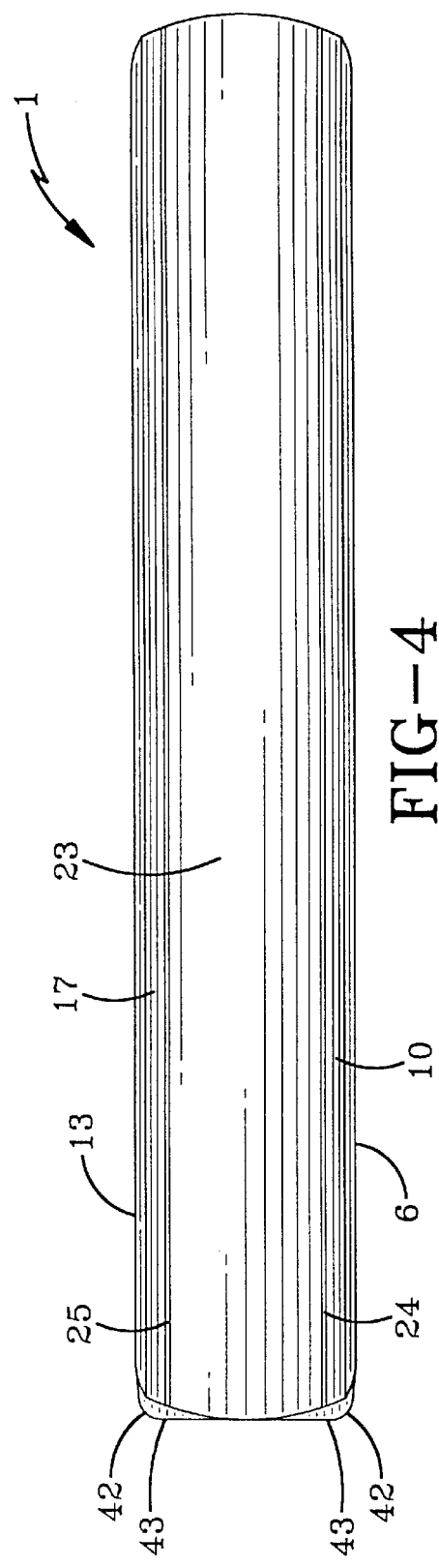
FIG. 4 is a back elevational view of the video cassette container of FIG. 1.
Figure 7:
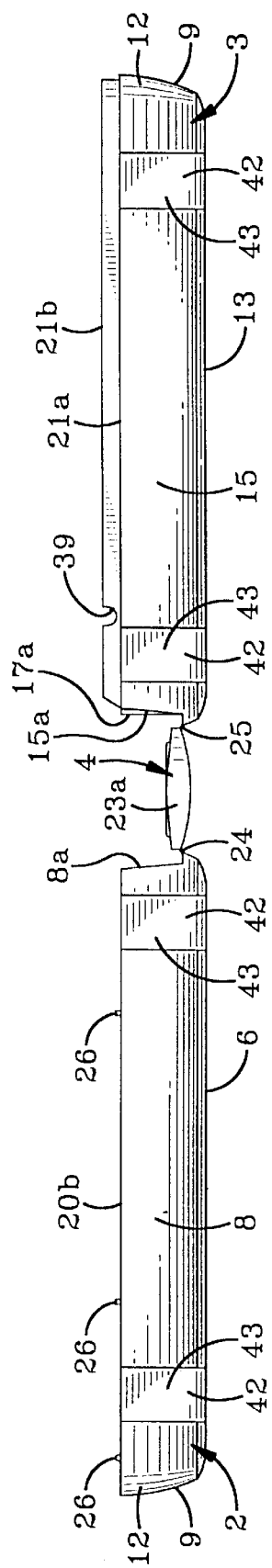
FIG. 7 is an end view of the video cassette container of FIG. 1 in an open position.
Figures 8, 9:
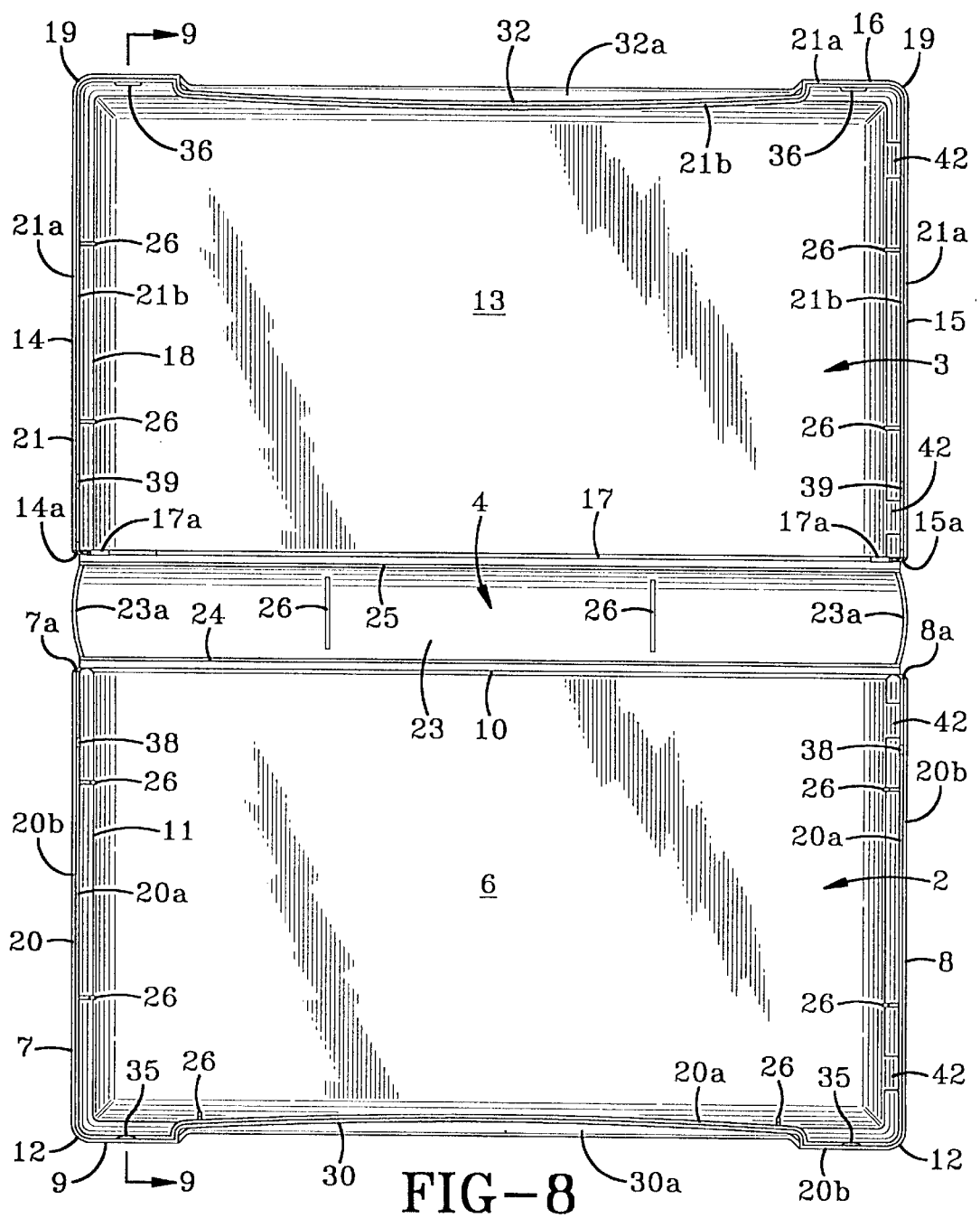
FIG. 8 is a top plane view of the video cassette container in open position.
Figure 13:
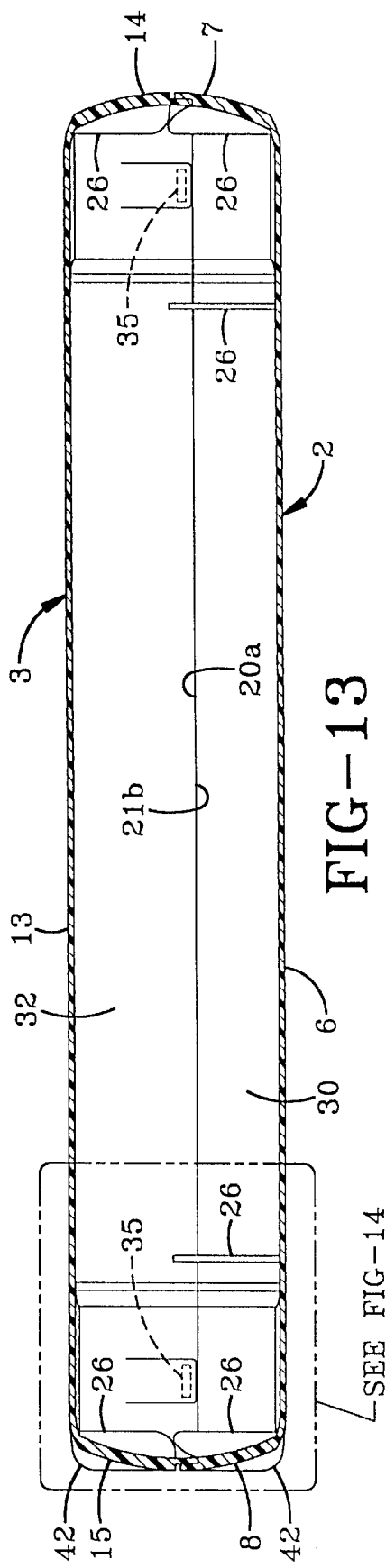
FIG. 13 is a front cross-sectional view of the video cassette container as shown in FIG. 1.
Figure 14:
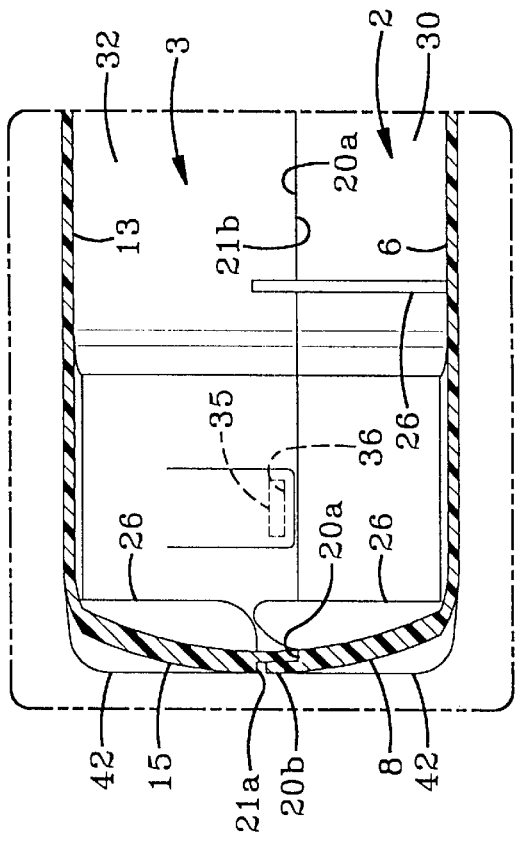
FIG. 14 is an enlarged view of one of the front ends of the video cassette container as shown in FIG. 13.

The video cassette storage container of the present invention is generally indicated at 1 and as is shown in FIG. 1 in a closed locked position and in FIG. 8 in a full open position. Container 1 has a rectangular box-shaped configuration and preferably is molded of a plastic material, such as a high impact polypropylene. Container 1 includes a closure lid and base, indicated generally at 2 and 3, respectively, which are hingedly connected together by a hinge assembly 4 for movement between the full open position, as shown in FIGS. 7–8, and the closed position, as shown in FIGS. 1–6.

Closure lid 2 (FIG. 8) has a rectangular-shaped bottom wall or panel 6 with upstanding parallel side walls 7 and 8, an upstanding front wall 9, and a slight upstanding rear wall or ridge 10. In accordance with one of the features of the invention, walls 7–10 are formed integrally with bottom wall 6 forming an outer rounded edge 11 (FIG. 1) therebetween, and side walls 7,8 are formed integrally with front and rear walls 9,10 forming outer rounded corners 12 therebetween. Sidewalls 7,8 and front end wall 9 are equal in height while rear end wall 10 is substantially less in height.

Base 3 has a flat rectangular-shaped top closure wall or panel 13, similar in size and configuration to bottom wall 6. Base 3 also has upstanding parallel side walls 14 and 15, an upstanding front wall 16, and a slight upstanding rear wall or ridge 17, where walls 14–17 are similar in size and configuration to walls 7–10, respectively. In accordance with one of the features of the invention, walls 14–17 are formed integrally with closure wall 13 forming an outer rounded edge 18 therebetween, and side walls 14,15 are formed integrally with front and rear end walls 16,17, respectively, forming outer rounded corners 19 therebetween. Sidewalls 14,15 and front end wall 16 are equal in height while rear end wall 17 is substantially less in height except for at each end 17a and 17b of rear wall 17 adjacent side walls 14 and 15 where the ends 17a,17b are equal in height to sidewalls 14,15.

Walls 7–9 of lid 2 include an outwardly extending top lip 20 and walls 14–16 of base 3 include an inwardly extending stepped shoulder 21 which receives lip 20 allowing lid 2 and base 3 to form a relatively dust-free seal therebetween when container 1 is in the closed position.

Hinge assembly 4 extends between lid 2 and base 3 and includes a rectangular-shaped hinge panel 23 pivotally connected between lid 2 and base 3 by a pair of spaced apart, parallel living hinges 24 and 25, respectively. Living hinge 24 is formed integrally with the top edge of rear wall 10 of lid 2 and extends outwardly from an outer surface thereof and living hinge 25 is formed integrally with the top edge of rear wall 17 of base 3. In accordance with one of the features of the invention, hinge panel 23 has a slightly concave configuration, as shown in FIG. 7, and terminates in opposing outer curved end edges. A small upstanding hinge closure end wall 23a is formed at these outer curved end edges at each end of hinge panel 23 and extends outward to form a somewhat triangular-shaped top edge.

In accordance with one of the features of the invention, a plurality of ribs 26 extend inwardly from the inner surface of walls 7–9 of lid 2, from the inner surface of walls 14,15 of base 3, and from the hinge panel 23. These ribs 26 are for centrally positioning a usual VHS tape within lid 2 and base 3 in between hinge panel 23 and front end walls 9 and 16 during closure of container 1.

In further accordance with one of the features of the invention, front end walls 9 and 16 of lid 2 and base 3, respectively, each have an inwardly angled arcuate-shaped section 30 and 32, respectively, which extending partially between and spaced apart from end walls 7,8 and 14,15, respectively. When lid 2 and base 3 are closed as is shown in FIG. 1, inwardly angled arcuate-shaped sections 30,32 form a central cavity 33. Cavity 33 allows a user to easily open container 1 when container 1 is in the closed latched position. Specifically, front walls 9 and 16 of lid 2 and base 3 are formed with slightly concave central portions so that when in the closed position, as shown in FIG. 1, larger grasping areas are provided which are of particular importance due to the rounded edges on container 1 since these grasping areas or ledges 30a and 32a as shown in FIGS. 1 and 8 facilitate the opening of the storage container, especially by smaller children who must grab these areas to pull the container apart.

The arcuate nature of sections 30,32 is specifically of a scalloped or comparable nature in which the centermost area of the sections extends the furthest inward. This arcuate nature not only facilitates opening but it also functions to assist in centrally positioning a usual VHS tape within lid 2 and base 3.

In even further accordance with one of the features of the invention, the inner surface of front end wall 9 of lid 2 along top lip 20 includes inwardly projecting nubs 35, and the outer surface of front end wall 16 of base 3 along stepped shoulder 21 includes inwardly extending slots 36. During closure of container 1, top lip 20 fits over stepped shoulder 21 whereby nubs 35 snap into slots 36 thereby locking lid 2 to base 3.

Also in accordance with one of the features of the invention, the inner surface of side walls 7,8 of lid 2 along top lip 20 includes inwardly projecting alignment nubs 38, and the side walls 14,15 of base 3 in stepped shoulder 21 include concave cutouts or notches 39. During closure of container 1, nubs 38 align with notches 39 or else closure is blocked. This alignment assures that top lip 20 is properly aligned with stepped shoulder 21 around the entire periphery of lid 2 and base 3, respectively.

Lid 2 and base 3 each include a pair of aligned supports or feet 42 formed integrally with one end wall 8 and 15, respectively. Supports 42 have a flat outer surface 43 which allows container 1 to stand upright on a flat surface in an endwise manner.

In operation, a VHS tape is placed within base 3 in between walls 14, 15, 16, 17a, and 17b when container 1 is open as is shown in FIG. 8, whereby the VHS tape is centered therein by ribs 26 and the inner surface of arcuate sections 30 and 32. Lid 2 is closed to the position shown in FIGS. 1–6 whereby during closing nubs 38 align with notches 39 to align lid 2 with base 3. When closure occurs, top lip 20 slides over stepped shoulder 21 and nubs 35 snap into slots 36. When opening is later desired, cavity 33 provides finger or thumb access for easy opening.

In storage, feet 42 provide sufficient stability so as to stand container 1 upright in an endwise manner as is often desirable. It is also desirous to provide an overall smooth container that is very attractive and less subject to breakage. This is accomplished by molding container 1 with each of its three outer peripheral edges and two outer peripheral corners on each of lid 2 and base 3 as a smooth downwardly curved radius surface, as shown in FIGS. 1–8 as edges 11 and 18, and corners 12 and 19 on lid 2 and base 3, respectively. Curved edges in combination with the outer curved exposed surface of concave hinge panel 23, provide a very attractive storage container free of pointed corners which are subject to breakage during shipment and use.

In storage also, hinge 23 has a arcuate surface with end walls 23a that provide a somewhat triangular-shaped surface for receiving the end edges of end walls 7,8 and 14,15, when the base and lid are in the closed position, as best shown in FIGS. 5–7. Thus, when moving toward the closed position, these end edges will slide along the outer surfaces of the larger hinge end walls and rest against stepped triangular-shaped shoulders when in the fully closed position, as shown particularly in FIGS. 5–6, to provide a further streamlined and pleasing appearance to container 1.

This hinge configuration ensures good closure of the base and lid, regardless of how the case is closed. Thus, both of the lid and base members can be moved toward each other simultaneously, or either of the members can be moved prior to the other member, as well as the directional movement of hinge panel, without affecting the smooth closure of the base and lid. Also, when in the closed position, outer edges of base 3 will automatically move over the recessed wall portions of the stepped shoulder of lid 2, as discussed above.

In summary, container 1 is molded in a substantially straight configuration as a one-piece member of a lightweight inexpensive plastic material. Living hinges 24 and 25 allow lid 2 and base 3, respectively, to pivot toward one another when container 1 is placed in the closed position. The rounded edges and corners of lid 2 and base 3 prevent chipping and cracking which often occur with square cornered containers. Cavity 33 provides an area for the user to insert his or her thumbs and easily open the container.

Accordingly, the improved video cassette storage container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved video cassette storage container is constructed and used, the characteristics of the construction, and the advantageous, new and useful results obtained; the new and useful structures, devices, elements, arrangements, parts and combinations, are set forth in the appended claims.

What is claimed is:

1. A storage container for storing an article of recorded media; the storage container comprising:
   a base having a substantially flat, rectangular-shaped top closure wall; substantially parallel, upstanding base side walls, and an upstanding base front wall; the base front wall being disposed substantially perpendicular to the base side walls;

the top closure wall having three peripheral edges that are downwardly curved with respect to the top wall; the three peripheral edges of the top closure wall being adjacent the base front and side walls;

each base side wall being joined with the base front wall at a corner having an outer rounded configuration;

a lid having a substantially rectangular-shaped bottom wall, a pair of upstanding, substantially parallel lid side walls, and an upstanding lid front wall; the lid front wall being disposed substantially perpendicular to the lid side walls;

the bottom wall having three peripheral edges that are downwardly curved with respect to the bottom wall; the three peripheral edges of the bottom wall being adjacent the lid front and side walls;

each lid side wall being joined with the front wall at a corner having an outer rounded configuration;

the lid side walls having a height and the base side walls having a height; the height of the lid side walls being substantially equal to the height of the base side walls;

the front walls of the base and lid cooperating to define a cavity that is adapted to allow a user to easily open the container when the container is in a closed configuration;

the cavity being disposed inwardly of the edge formed between the base front wall and the top closure wall of the base such that the edge disposed between the base front wall and the top wall of the base is continuous and uninterrupted; and the cavity being disposed inwardly of the edge formed between the lid front wall and the bottom wall of the lid such that the edge formed between the lid front wall and the bottom wall of the lid is continuous and uninterrupted;

the base including a ledge disposed adjacent the edge that joins the base front wall to the base top closure wall; the ledge extending entirely across the width of the cavity defined by the front walls of the container;

the container including a ledge disposed adjacent the edge formed between the lid front wall and the bottom wall of the lid; the ledge extending entirely across the width of the cavity defined by the front walls of the container;

the top closure wall of the base overhanging the cavity to form a ledge; and the bottom wall of the lid overhanging the cavity to form a ledge.

2. The container of claim 1, wherein the base and lid are integrally formed together.

3. The container of claim 2, wherein the base and lid are connected together with at least one living hinge.

4. The container of claim 3, wherein a pair of living hinges are used to connect the lid to the base.

5. The container of claim 4, further comprising a hinge panel disposed intermediate the living hinges.

6. The storage container of claim 1, further comprising means for latching the base and lid together when the lid is in a closed position.

7. The storage container of claim 1, wherein one of the side walls of the base and one of the side walls of the lid define substantially planar portions that are disposed substantially perpendicular to the top and bottom closure walls such that the container may stand on the substantially planar portions.

* * * * *